(12) United States Patent
Gaulmin et al.

(10) Patent No.: US 7,769,521 B2
(45) Date of Patent: Aug. 3, 2010

(54) METHOD AND A DEVICE FOR PERFORMING A CHECK ON THE STATE OF HEALTH OF A TURBINE ENGINE OF A TWIN-ENGINED ROTORCRAFT

(75) Inventors: Francois-Xavier Gaulmin, Salon de Provence (FR); Lionel Iraudo, Marseille (FR)

(73) Assignee: Eurocopter, Marignane (FR)

( * ) Notice: Subject to any disclaimer, the term of this patent is extended or adjusted under 35 U.S.C. 154(b) by 790 days.

(21) Appl. No.: 11/730,835

(22) Filed: Apr. 4, 2007

(65) Prior Publication Data

US 2007/0260391 A1 Nov. 8, 2007

(30) Foreign Application Priority Data

Apr. 5, 2006 (FR) .................. 06 02981

(51) Int. Cl.
   *G06F 19/00* (2006.01)
   *G06G 7/70* (2006.01)
(52) U.S. Cl. ................. 701/100; 244/17.11; 244/17.13; 701/3; 701/99; 60/39.43
(58) Field of Classification Search ............... 701/33, 701/99–100, 34; 244/6, 17.11, 17.13; 73/112.01; 60/39.43; 415/13
   See application file for complete search history.

(56) References Cited

U.S. PATENT DOCUMENTS 4,815,294 A * 3/1989 David ........................ 60/595

5,018,069 A * 5/1991 Pettigrew ..................... 701/35
5,408,412 A * 4/1995 Hogg et al. .................. 701/33
6,917,908 B2 * 7/2005 Williams ....................... 703/8

(Continued)

FOREIGN PATENT DOCUMENTS

DE    68919732 E  *  1/1995

(Continued)

OTHER PUBLICATIONS oRotorcraft dynamics model identification and hovering motion control simulation; Chang, Y.S.; Kim, B.I.; Keh, J.E.; Industrial Electronics, 2008. IECON 2008. 34th Annual Conference of IEEE; Digital Object Identifier: 10.1109/IECON.2008.4757981; Publication Year: 2008 , pp. 366-370.*

(Continued)

*Primary Examiner*—Cuong Nguyen
(74) *Attorney, Agent, or Firm*—Young & Thompson

(57) ABSTRACT

The present invention relates to a method and to a device (D) enabling a health check to be performed on at least a first turbine engine (M1) of a rotorcraft, the rotorcraft being provided with first and second turbine engines (M1 and M2) controlled respectively by first and second control means (MC1 and MC2). The device is remarkable in that it comprises check means (C) provided with main means (C1), the main means (C1) controlling the first and second control means (MC1 and MC2) so that the surveillance parameters of the first and second turbine engines (M1 and M2) respectively reach the real first and second final values (V1$f$ and V2$f$) as determined in accordance with the method of the invention.

16 Claims, 1 Drawing Sheet

U.S. PATENT DOCUMENTS

| | | | |
|---|---|---|---|
| 7,523,603 B2 * | 4/2009 | Hagen et al. | 60/39.55 |
| 2002/0016654 A1 * | 2/2002 | Ing et al. | 701/29 |
| 2002/0133322 A1 * | 9/2002 | Williams | 703/8 |
| 2007/0260391 A1 * | 11/2007 | Gaulmin et al. | 701/100 |
| 2008/0294305 A1 * | 11/2008 | Roesch | 701/3 |
| 2009/0019830 A1 * | 1/2009 | Certain | 60/39.281 |
| 2009/0113871 A1 * | 5/2009 | Certain | 60/39.43 |
| 2009/0139200 A1 * | 6/2009 | Colaprisco | 60/39.092 |
| 2009/0139202 A1 * | 6/2009 | Agrawal et al. | 60/226.3 |
| 2009/0140182 A1 * | 6/2009 | Agrawal et al. | 251/5 |
| 2009/0321554 A1 * | 12/2009 | Roesch | 244/6 |
| 2010/0065677 A1 * | 3/2010 | Ferrier | 244/6 |

FOREIGN PATENT DOCUMENTS

| | | |
|---|---|---|
| DE | 3926707 C2 * | 12/1998 |
| DE | 69720076 E * | 4/2003 |
| EP | 0 095 378 | 5/1983 |
| EP | 0 322 342 | 12/1988 |
| EP | 0 322 343 | 12/1988 |
| EP | 335569 A * | 10/1989 |
| FR | 002657788 A1 * | 8/1991 |
| GB | 2 079 707 | 1/1982 |
| GB | 2226430 A * | 6/1990 |
| WO | WO 2007099526 A1 * | 9/2007 |

OTHER PUBLICATIONS

Modeling of unmanned small scale rotorcraft based on Neural Network identification; Putro, I.E.; Budiyono, A.; Yoon, K.J.; Kim, D.H.; Robotics and Biomimetics, 2008. ROBIO 2008. IEEE International Conference on; Digital Object Identifier: 10.1109/ROBIO.2009.4913297; Publication Year: 2009 , pp. 1938-1943.*

Description of a Modeling, Simulation, Animation, and Real-Time Control (MoSART) Environment for a Class of 6-DOF; Dynamical Systems; Rodriguez, A.A.; Cifdaloz, O.; Phielipp, M.; Dickeson, J.; American Control Conference, 2007. ACC '07 Digital Object Identifier: 10.1109/ACC.2007.4283129; Publication Year: 2007 , pp. 2515-2520.*

Robust low altitude behavior control of a quadrotor rotorcraft through sliding modes; Efe, M.O.; Control & Automation, 2007. MED '07. Mediterranean Conference on; Digital Object Identifier: 10.1109/MED.2007.4433755; Publication Year: 2007 , pp. 1-6.*

* cited by examiner

Fig.1
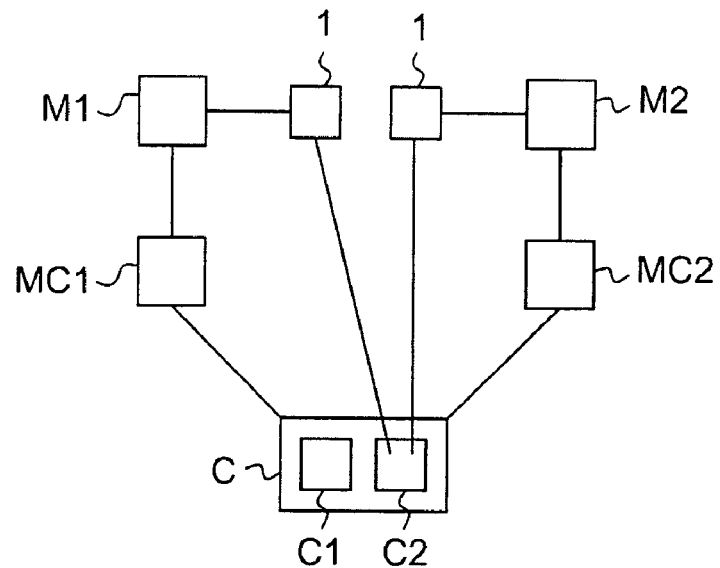
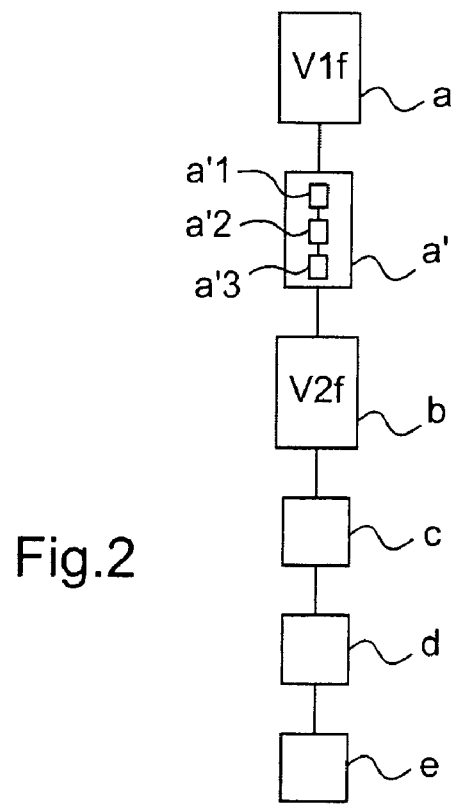
Fig.2

METHOD AND A DEVICE FOR PERFORMING A CHECK ON THE STATE OF HEALTH OF A TURBINE ENGINE OF A TWIN-ENGINED ROTORCRAFT

The present invention relates to a method and to a device enabling a check to be made on the state of health of a turbine engine mounted on board of a twin-engined rotorcraft.

BACKGROUND OF THE INVENTION

A rotorcraft is piloted while monitoring numerous instruments on the instrument panel, most of which instruments are representative of the operation of the power plant of the rotorcraft. For physical reasons, there are numerous limits that the pilot needs to take into account at all times during a flight. These various limits depend in general on the stage of the flight and on external conditions.

Most presently-constructed twin-engined rotorcraft are fitted with two free turbine engines for driving the main lift and propulsion rotor. Power is then taken from a low-pressure stage of each free turbine, which stage is mechanically independent of the compressor assembly and of the high-pressure stage of the turbine engine. Each free turbine of the turbine engines has a speed of rotation lying in the range 20,000 revolutions per minute (rpm) to 50,000 rpm, so a stepdown gearbox is needed in the connection to the main rotor whose own speed of rotation lies substantially in the range 200 rpm to 400 rpm: this is the main transmission gearbox.

Thermal limits on the turbine engine and limits on the torque that the main transmission gearbox can accept enable three power ratings to be defined for normal use of the turbine engine:
  takeoff rating, that can be used for 5 to 10 minutes, corresponding to a level of torque on the gearbox and a level of heating in the turbine engine that can be accepted for a limited length of time without significant degradation: this is the maximum takeoff power (PMD);
  the maximum continuous power rating during which capabilities are not exceeded at any time, this applies both to the capabilities of the transmission gearbox and to the capabilities that result from maximum heating that can be accepted continuously by the high-pressure blades of the first stage of the turbine: this is maximum continuous power (PMC); and
  maximum transient rating, optionally capped by regulation: reference is then made to maximum transient power (PMT).

There also exist supercontingency excess power ratings that are used only when one of the two turbine engines breaks down:
  the supercontingency rating during which the capabilities of the transmission gearbox in its inlet stages and the thermal capabilities of the turbine engine are used to the maximum: this is referred to as super-emergency power (PSU), it can be used during 30 consecutive seconds at most, and only three times in any one flight. If the PSU is used, then the turbine engine must be removed and overhauled;
  the supercontingency rating during which the capabilities of the inlet stages of the transmission gearbox and the capabilities of the turbine engine are used to a large extent: this is referred to as maximum emergency power (PMU) that can be used for 2 minutes following PSU or for 2 minutes and 30 seconds consecutively at most; and
  the supercontingency rating during which the capabilities of the inlet stages of the transmission gearbox and the thermal capabilities of the turbine engine are used without damage: this is referred to as intermediate emergency power (PIU) and it can be used for 30 minutes or continuously for the remainder of the flight after the turbine engine has broken down.

Under such conditions, the engine manufacturer determines, by calculation or by testing, curves representing the power available from a turbine engine as a function of altitude and temperature, and does so for each of the above-defined ratings. Similarly, the manufacturer determines the lifetime of the turbine engine and the minimum power that is guaranteed for each rating, where the guaranteed minimum power corresponds to the power that the turbine engine will deliver at the end of its service life, and where such a turbine engine is referred to below for convenience as an "old" turbine engine.

In order to verify that the turbine engine is operating properly, it is therefore appropriate to carry out a health check to ensure that the turbine engine is delivering performance better than or equal to the performance of an old turbine engine.

Two surveillance parameters are particularly important for checking the performance of a turbine engine.

Since the turbine engine has a high-pressure turbine located upstream from a free turbine, one surveillance parameter is the turbine entry temperature (TET) of the gas at the entry to the high-pressure turbine.

The blades of the high-pressure turbine of the turbine engine are subjected to centrifugal force and to the temperature TET. Above a certain level, the material from which the blades are made becomes subjected to creep, thereby having the consequence of lengthening the blades. Thus, the blades begin to touch the casing of the high-pressure turbine, and they are thus degraded. The temperature TET is thus linked directly to degradation of the turbine engine.

Nevertheless, it is very difficult to measure the temperature TET because of its relatively non-uniform nature, so the first surveillance parameter is preferably the temperature of the gas at the entry to the free turbine, known as T45 to the person skilled in the art. This temperature is a good image of the temperature TET, and consequently it is representative of turbine engine degradation.

Another surveillance parameter relates to the power delivered by the turbine engine, referred to as W by the person skilled in the art, or in equivalent manner the torque from the turbine engine, given that the power and the torque of an engine are closely linked. Nevertheless, the speed of rotation of the turbine engine gas generator, referred to as Ng by the person skilled in the art, is proportional to the power delivered by the turbine engine, so the second surveillance parameter actually used can also be the speed of rotation of the gas generator.

Below, verifying the state of health of a turbine engine consists either:
  in controlling the turbine engine to reach a given value for the first surveillance parameter and then verifying that the value of the second surveillance parameter is less than or equal to the value that the second surveillance parameter would take in an old turbine engine under the same conditions; or else
  controlling the turbine engine to reach a given value for the second surveillance parameter and then verifying that the value of the first surveillance parameter is less than or equal to the value that the first surveillance parameter would take in an old turbine engine under the same conditions.

The health check must be carried out rigorously since if it is performed poorly, i.e. if the above-mentioned verifications do not give satisfactory results, that will have a non-negligible impact on potential immobilization of the rotorcraft and on its maintenance costs.

In this configuration, it is appropriate firstly to determine whether the poor result of the health check is the consequence of malfunction of the power plant rather than of the turbine engine. Secondly, it might then be necessary to remove the turbine engine so that an operator, e.g. the manufacturer of the turbine engine, can verify the degradation in its performance on a test bench and then replace the defective elements.

It can thus be understood that it is essential to carry out the health check with the greatest possible care so as to avoid immobilizing a rotorcraft without good reason. Unfortunately, it is extremely difficult to carry out a health check under good conditions on a twin-engined rotorcraft.

For such an aircraft, a first solution consists in carrying out a health check during a cruising flight, which presents the advantage of the check being carried out during a stage of flight without disturbances and thus with a turbine engine that is well stabilized.

Nevertheless, the power developed by turbine engines during such a flight is well below the reference powers, i.e. the maximum takeoff power (PMD), for example. Unfortunately, it is found that a health check is not accurate unless the power developed by the turbine engine being checked is close to its reference power.

Furthermore, on a twin-engined rotorcraft, it is appropriate to ensure that each engine is capable of developing the minimum power guaranteed during supercontingency ratings. Consequently, it is preferable to perform the health check at a rating that is as close as possible, in terms of power developed, to such supercontingency ratings. As a result, health checks are preferably implemented at a power close to the maximum takeoff power PMD, but that is not compatible with cruising flight.

A second solution consists in carrying out a health check while cruising at high speed, by increasing the power developed by the turbine engines so as to approach PMD, for example. Although effective, that solution leads to complaints from the passengers of a rotorcraft who are disturbed by the vibration generated in the cabin as a result of flying conditions.

A third solution consists merely in increasing the power developed by the turbine engine being checked. Although tempting, that solution suffers from drawbacks.

Since the rotorcraft is twin-engined, its turbine engines will then be unmatched in terms of power. Consequently, modern turbine-engine computers detect a loss of power. Under such conditions, a red alarm is activated by the computers to inform the pilot that a aircraft must imperatively be landed. Furthermore, such detection leads to contingency ratings being engaged.

Such a situation has indeed been tried by pilots seeking to carry out a health check on a turbine engine, but it remains forbidden by the authorities responsible for aviation if there are passengers present on the rotorcraft. It will readily be understood that no risks must be taken, and flying with an active alarm of the most serious type together with a reduced safety margin, cannot be accepted since this configuration leads to a significant and harmful increase in the workload on the pilot of the rotorcraft.

As a result, owners of a twin-engined rotorcraft have had until now only one solution for checking the state of health of the turbine engines of a rotorcraft, namely carrying out a special technical flight dedicated to checking health. The impact of doing this on the maintenance cost of the rotorcraft is not negligible insofar as the manufacturer of the turbine engine generally requires health checks to be performed every 25 hours. Similarly, each technical flight takes the place of a paid-for flight, and that ends up constituting a major cost for the owner of a rotorcraft.

OBJECTS AND SUMMARY OF THE INVENTION

An object of the present invention is to propose a method and a device that enable a health check to be performed on a turbine engine of a twin-engined rotorcraft without requiring a special technical flight.

According to the invention, a method of performing a health check on at least a first turbine engine of a rotorcraft, said rotorcraft having first and second turbine engines presenting, before said health check, respectively first and second normal values for a surveillance parameter and also real first and second final values for said surveillance parameter during said health check, is remarkable in that the following steps are performed in succession:

a) determining the real first final value of said surveillance parameter that said first turbine engine is to reach in order to perform said health check accurately;

b) assuming that said real second final value of said surveillance parameter of said second turbine engine is equal to said second normal value of said second turbine engine;

c) determining the difference between said real first final value and said real second final value;

d) if said difference is greater than a predetermined threshold, readjusting said real second final value so that the difference between said real first final value and said real second final value is less than said predetermined threshold during the health check; and e) controlling said first turbine engine so that said first normal value before said health check reaches said real first final value during said health check, and controlling said second turbine engine so that said second normal value before said health check reaches said real second final value.

This method thus involves determining the real first final value of the surveillance parameter to be reached by the first turbine engine for it to be checked properly, and then the real second final value of the surveillance parameter to be reached by the second turbine engine is then possibly modified so as to avoid triggering a red alarm.

In a first implementation of the method, the surveillance parameter is the power W developed by said first turbine engine. For example, the first normal value of the power of the first turbine engine is increased so as to reach the real first final value for said power. Thereafter, it is assumed that the final second value for the power of the second turbine engine is equal to the second normal value, and the difference is taken between these real first and second final values. If the difference is found to be greater than the predetermined threshold, then the second final value is increased until said difference becomes less than said predetermined threshold. It will readily be understood that this example corresponds to one variant of the invention and that applying the variants explained below modifies the way the method is performed somewhat.

In a second implementation of the method, the first turbine engine has a gas generator, and the surveillance parameter is the speed of rotation Ng of the gas generator.

Furthermore, with reference to a first variant of the invention that makes it possible to achieve good repeatability and to compare the results of a plurality of health checks, in the first implementation of the method, during step a), the real first final value of the surveillance parameter is determined by modulating a given reduced final value, referred to as Ng' by the person skilled in the art, on the basis of the external temperature surrounding the rotorcraft, referred to as T0 by the person skilled in the art. The real final value of the surveillance parameter Ng is then determined using the following first relationship:

$$Ng = Ng'\sqrt{\frac{T0}{288}}$$

In the second implementation of the method, during step a), the real first final value of the surveillance parameter, i.e. the power W, is determined by modulating a given reduced value, known as W' by the person skilled in the art, on the basis both of the external pressure known as P0 by the person skilled in the art and of the external temperature T0 of the surroundings of aircraft. The real first final value of the surveillance parameter W is then determined using the following second relationship:

$$W = W'\left(\left(\frac{P0}{1013.25}\right)^{\alpha}\left(\frac{T0}{288.15}\right)^{\beta}\right)$$

where the terms $\alpha$ and $\beta$ lie in the range −1 to +1 as a function of the turbine engine.

In this way, it is ensured that the real first final value of the surveillance parameter at which the health check is performed corresponds to a reduced final value that does not depend on external conditions and that is identical during all of the health checks that are carried out. Thereafter, it is easy to compare all of the results obtained.

Advantageously, a second variant of the invention takes account of the limitations of an additional unit, namely the power transmission gearbox that transfers the power developed by the turbine engines to the rotor providing lift and propulsion to the rotorcraft by driving the blades of the rotorcraft in rotation. On a twin-engined rotorcraft, the power transmission gearbox has one inlet for each turbine engine, and each inlet can receive without damage power not exceeding a maximum power given by the manufacturer, and otherwise suffering mechanical degradation.

Consequently, during a step a') that follows step a), the following steps are performed in succession:

a'1) determining an intermediate power that said first turbine engine is to deliver so that said surveillance parameter reaches said real first final value; and a'2) if said intermediate power is less than the maximum power accepted by said power transmission gearbox, then said real first final value remains unchanged; or else a'3) if said intermediate power is greater than said maximum power accepted by said power transmission gearbox, then said real first final value is made equal to the value that the surveillance parameter needs to reach in order to cause said final first power of said first turbine engine to be equal to said maximum power.

Thus, it becomes impossible to go beyond the mechanical capabilities of the power transmission gearbox. The first final power of the first turbine engine during the health check is thus equal to an optimum value, i.e. the intermediate power, or by default to the maximum power that can be accepted at the inlet to the gearbox.

In addition, in accordance with a third variant of the invention, during step a'), and in particular during steps a'1) and a'3), the effects of engine mounting are incorporated, e.g. effects due to head losses in the air inlets to the turbine engine, or indeed to pressure distortions, or even to the nozzles. These engine-mounting effects lie behind differences between the values of the parameters when the first turbine engine is mounted on a test bench and when the first turbine engine is mounted on the rotorcraft. It is therefore advantageous to take account thereof in order to increase accuracy while comparing the results of health checks with the results obtained on a test bench for an old turbine engine, for example.

Furthermore, a fourth variant serves, whenever possible, to carry out a health check without changing the general attitude of the rotorcraft and without changing the speed of rotation of the rotor and thus the overall power transmitted by the first and second turbine engines.

Consequently, prior to step c), the first and second turbine engines together develop an overall power that is equivalent to the sum of the first and second normal powers developed respectively by the first and second turbine engine before the health check, and the real second final value estimated during step b) is readjusted in such a manner that the overall power developed prior to the health check is equal to the overall power developed during the health check.

The sum of the first and second final powers is thus equal to the overall power developed by the first and second turbine engines during the health check, i.e. to the sum of the first and second normal powers developed by the first and second turbine engines before the health check.

It will be understood that it is possible to use one or more of the above variants depending on requirements and regardless of the implementation.

In addition, the present invention also provides a device enabling a health check to be performed on at least a first turbine engine of a rotorcraft by implementing the above-described method, the rotorcraft being provided with first and second turbine engines controlled respectively by first and second control means.

The device is remarkable in that it comprises check means provided with main means, the main means controlling the first and second control means so that the surveillance parameters of the first and second turbine engines reach respectively the real first and second final values as determined in compliance with the method of the invention.

Furthermore, the device includes secondary means integrated in the check means or in the control means, receiving a plurality of items of information for performing the check and diagnosing the health of the first and second turbine engines.

Advantageously, these items of information come from main sensors measuring the values of parameters of the first turbine engine to be checked, i.e. the final power developed by the turbine engine, the temperature of the gas at the entry to the free turbine of the first turbine engine, the speed of rotation of the free turbine, and the torque of the first turbine engine, these last three parameters being known respectively as T45, NTL, and C by the person skilled in the art.

In addition, the main means and the secondary means incorporate the engine-mounting effects in order to improve the accuracy of the results of the health check.

Furthermore, in a first embodiment of the device, the main means determine automatically, during step a) of the method, the real first final value that a surveillance parameter of the first turbine engine is to reach for the health check to be performed accurately. Consequently, the manufacturer includes in the main means the real first final value to be reached or else the reduced real first value if the above-described first variant is applied.

In a second embodiment of the device, the pilot of the rotorcraft specifies to the main means the first final value to be reached by a surveillance parameter of the first turbine engine to ensure that the health check is performed accurately. Here likewise, this may either be directly the real final value or else the reduced final value, depending on the variant used.

Under such circumstances, with the first final value to be reached by a surveillance parameter of the first turbine engine to ensure that the health check is performed accurately being determined with the help of a reduced first final value modulated by at least the external pressure and possibly the external temperature surrounding the rotorcraft, the pilot of the rotorcraft specifies to the main means the reduced final value so that the main means determines the real first final value to be reached by the surveillance parameter of the first turbine engine.

BRIEF DESCRIPTION OF THE DRAWING

The invention and its advantages appear in greater detail from the following description which shows preferred embodiments, given with out limiting character, and with reference to the accompanying figures, in which:

FIG. 1 is a diagram describing the device of the invention; and

FIG. 2 shows certain steps of the method of the invention.

MORE DETAILED DESCRIPTION

Elements present in a plurality of distinct figures are given the same reference in all of them.

Conventionally, the two-engine rotorcraft comprises first and second turbine engines M1 and M2 that are controlled respectively by first and second control means MC1 and MC2. The first and second turbine engines M1 and M2 deliver respectively first and second normal powers referred to as W1c and W2c before the beginning of a health check, and also first and second final powers, referred to as W1f and W2f, during the health check. In addition, since each of the first and second turbine engines has a respective gas generator, the first and second normal powers lead respectively to first and second normal speeds of rotation of the gas generators. Similarly, the first and second final powers lead to respective first and second final speeds of rotation of the gas generators.

In a first version, the turbine engines are controlled in power. To accelerate or slow down one of the turbine engines, the power of that turbine engine is raised or lowered, thereby increasing or lowering the speed of rotation of its gas generator.

In a second version, each turbine engine is controlled by the speed of rotation of its gas generator. To accelerate or slow down a turbine engine, the speed of rotation of its gas generator is increased or lowered, thereby increasing or reducing the power of the turbine engine.

These two parameters enabling the turbine engines to be controlled are referred to as surveillance parameters. In a first implementation of the method, the surveillance parameter is the turbine engine power. Under such circumstances, the first and second normal values, written V1c and V2c, and the first and second final values, written V1f and V2f, of the surveillance parameter are respectively the first and second normal powers and the first and second final powers.

In contrast, in a second implementation of the method, the surveillance parameter is the speed of rotation of the gas generator. Consequently, the first and second normal values V1c and V2c and the first and second final values V1f and V2f of the surveillance parameter are respectively the first and second normal speeds of rotation of the gas generators and the first and second final speeds of rotation of the gas generators.

In addition, the rotorcraft includes a device D serving to check the state of health of each turbine engine. For convenience, in the explanation below, it is assumed that only the first turbine engine M1 is being checked, but it will readily be understood that the device and the method of the invention can be used in the same manner to check the second turbine engine M2.

Consequently, the device D includes check means C having main means C1 and secondary means C2. In another variant, the secondary means C2 are integrated in the first and second control means MC1 and MC2, each control means having its own secondary means.

The main means C1 then determines the real first and second final values V1f and V2f of the surveillance parameters that are to be reached during a health check. Thereafter, the main means C1 order the first and second control means MC1 and MC2 to act on the first and second turbine engines M1 and M2 so that they reach the real first and second final values V1f and V2f for the surveillance parameter during the health check.

When the real first and second final values V1f and V2f of the surveillance parameter are reached, the secondary means C2 perform the health check with the help of information coming from the sensors 1, and possibly integrating engine-mounting effects. For example, the sensors 1 measure the final power developed by the turbine engine being checked, the temperature of the gas at the inlet to the free turbine of the first turbine engine, the speed of rotation of the free turbine of the first turbine engine, the torque of the first turbine engine, and the speed of rotation of its as generator.

FIG. 2 explains the method of the invention enabling the first turbine engine M1 being checked to reach a real first final value during a health check that is sufficient to obtain results that are accurate. The method is implemented by the device D.

During a step a), the main means C1 of the check means C determine, either automatically or with help from the pilot, the real first final value v1f of a surveillance parameter of the first turbine engine M1 that must be reached in order to perform the health check of this first turbine engine M1 accurately.

In a first implement of the method, the surveillance parameter is the power W developed by the first turbine engine M1, whereas in a second implementation of the method, it is represented by the speed of rotation Ng of the gas generator of the first turbine engine M1.

For a better understanding of the method, the description thereof is accompanied by a concrete example in which the surveillance parameter under consideration is the speed of rotation Ng of the first turbine engine. Consequently, it is the second implementation that is described below.

In a first variant of the method, the real final value of the surveillance parameter is determined by modulating a reduced value using the external temperature T0 and possibly the external pressure P0.

In this way, it becomes possible to compare various health checks with one another, and also to compare the performance of the first turbine engine M1 as measured during the health check with the performance of an old turbine engine, since the initial assumptions no longer depend on those external conditions, as a result of the modulation.

Starting from a reduced final value for the surveillance parameter Ng that the first turbine engine M1 is to reach during the health check, e.g. a value equal to 99.7% of the speed of rotation of the gas generator at the power PMD, a real final value V1f is finally obtained with the help of the first relationship that takes account of external conditions, which value V1f is equal to 99.3%, for example. It will be understood that this is 99.3% of the speed of rotation of the gas generator at the power under consideration, i.e. the power PMD in this example. Nevertheless, for convenience and in order to simplify the present description, it is no longer mentioned below that this is a percentage of the speed of rotation of the gas generator at the power under consideration.

The reduced value may be set by the main means C1, or it may be specified to said main means C1 by the pilot using an interface such as a digital keypad. It can readily be understood that if the above-mentioned first variant of the method is not implemented, it is the real final value V1f that is set by the main means C1 or that is specified by the pilot.

Following this step a), a second variant also implements a step a') taking into consideration the limitations of an additional member, namely the power transmission gearbox. It is possible that going from the first normal value V1c to the real first final value V1f leads to an increase in power that presents difficulties if the real final power W1f is greater than the maximum power that can be accepted by the inlet to the power gearbox connected to the first turbine engine M1.

For the purposes of the example, it is assumed that both inlets of the power gearbox can accept a maximum power of 556 kilowatts (kW).

The step a') then begins with a step a'1) during which the main means C1 determine an intermediate power that the first turbine engine M1 is to develop in order to ensure that the surveillance parameter reaches its final value, i.e. 618 kW, for example.

In accordance with step a'2), if the intermediate power is less than the maximum power, then there is no change to the real first final value V1f, i.e. Ng equal to 99.3% in this example.

However, this does not apply in the present example since the intermediate power is 618 kW, whereas the maximum power is 556 kW. Consequently, with reference to step a'3), when the intermediate power is greater than the maximum power that can be accepted by the power gearbox, then the real first final value V1f becomes equal to the value that the surveillance parameter needs to reach to ensure that the first final power of the first turbine engine is equal to the maximum power. In this way, the power gearbox is preserved from potential damage. It is then appropriate to determine the real first final value V1f at which the first final power is equal to 556 kW, preferably taking consideration of engine mounting losses in accordance with the third variant. This produces a real first final value V1f of 97.7%, for example.

From this point on, this real first final value to be reached remains the same throughout the remainder of the method.

Step b) then begins, during which the main means C1 assumes that the real second final value V2f of the surveillance parameter of the second turbine engine M2 is equal to the second normal value V2c of said second turbine engine M2, the second normal and final values V2c and V2f corresponding to the values of the surveillance parameter of the second turbine engine M2 before and during the health check.

Nevertheless, in a fourth variant, before step c), the real second final value estimated during step b) is readjusted so as to avoid disturbing the general attitude of the rotorcraft, and in particular its speed of advance.

Before the health check, the first and second turbine engines M1 and M2 develop first and second normal powers W1c and W2c, e.g. of 478 kW, so between them they develop a total power equivalent to the sum of the first and second normal powers W1c and W2c, i.e. 956 kW.

To ensure that the speed of advance of the rotorcraft remains constant, in particular during the health check, so as to avoid disturbing any passengers of the rotorcraft, the main means C1 readjust the real second final value V2f so that the overall power remains constant and is thus likewise equal to the sum of the first and second normal powers W1c and W2c, as well as to the sum of the first and second final powers W1f and W2f.

In the example described, the first final power is 556 kW, so the second final power is equal to 956 kW minus 556 kW, i.e. 400 kW. Consequently, after making allowance for any engine mounting losses, the main means C1 obtain a real second final value of 93.6%, for example.

Step c) can then begin. The main means C1 determine the difference between the real first final value and the second final value. In this example, the main means then determine the difference between the first final value V1f for the speed of rotation of the gas generator of the first turbine engine, i.e. 97.7%, and the second final value V2f for the speed of rotation of the gas generator of the second turbine engine, i.e. 93.6%, leading to a difference of 4.1%.

In order to comply with the regulations that are in force, it is appropriate to avoid triggering a red alarm, so this difference must be less than a predetermined threshold.

In accordance with step d), if this is not the case, then the main means C1 readjust the real second final value, e.g. by increasing it, so that the difference is finally reduced to below the predetermined threshold.

Consequently, if the predetermined threshold in this example is about 3%, then it is appropriate to raise the real second final value V2f by (4.1%-3%), i.e. 1.1% in order to end up with 93.3% plus 1.1%, i.e. 94.4%.

Finally, in a final step e), the main means C1 acts via the control means MC1 and MC2 to order the first and second turbine engines M1 and M2 to reach the first and second final powers. Thereafter, the secondary means C2 can receive the required information from the sensors 1 in order to perform the health check.

The method is substantially equivalent in the first implementation in which the surveillance parameter is the turbine engine power. Nevertheless, it is slightly simplified insofar as it is not necessary to have steps for going from the power to the speed of rotation of the gas generator.

The main means C1 begin by determining a real final value of 600 kW, for example, using the second relationship, starting from a reduced final value W' of 618 kW during step a) and then implements step a'). The intermediate power is then equal to the real final value, i.e. 600 kW, which is greater than the maximum power that can be accepted by the power gearbox.

The real final value is then equal to the maximum power, i.e. 556 kW, for example.

In accordance with step b), the main means C1 estimate that the real second final value is equal to the normal second value, i.e. 478 kW, for example.

Nevertheless, in applying the second variant, in order to conserve overall power, the main means C1 readjust the real second final value to a value equal to the overall power, e.g. 956 kW, minus the previously-determined real first final value of 556 kW, giving 400 kW.

During step c), the main means determine the difference between the real first final value and the real second final value, this difference being 156 kW, and then during step d) they compare it with a predetermined threshold to avoid triggering the red alarm.

If the difference is greater than the predetermined threshold, e.g. equal to 120 kW, then the main means C1 readjust the second final value by increasing it by 36 kW so that said difference is no longer greater than the predetermined threshold.

Finally, the main means C1 control the first and second turbine engines M1 and M2 so that they reach the real first and second final values.

Naturally, the present invention can be subjected to numerous variations concerning its implementation. Although several implementations are described above, it will readily be understood that it is not conceivable to identify exhaustively all possible implementations. It is naturally possible to envisage replacing any means described by equivalent means without going beyond the ambit of the present invention.

What is claimed is:

1. A method of performing a health check on at least a first turbine engine (M1) of a rotorcraft, said rotorcraft having first and second turbine engines (M1 and M2) presenting, before said health check, respectively first and second normal values (V1c, V2c) for a surveillance parameter and also real first and second final values (V1f, V2f) for said surveillance parameter during said health check, wherein the following steps are performed in succession:
    a) determining the real first final value (V1f) of said surveillance parameter that said first turbine engine (M1) is to reach in order to perform said health check accurately;
    b) assuming that said real second final value (V2f) of said surveillance parameter of said second turbine engine (M2) is equal to said second normal value (V2c) of said second turbine engine (M2);
    c) determining the difference between said real first final value (V1f) and said real second final value (V2f);
    d) if said difference is greater than a predetermined threshold, readjusting said real second final value (V2f) so that the difference between said real first final value (V1f) and said real second final value (V2f) is less than said predetermined threshold during the health check; and
    e) controlling said first turbine engine (M1) so that said first normal value (V1c) before said health check reaches said real first final value (V1f) during said health check, and controlling said second turbine engine (M2) so that said second normal value (V2c) before said health check reaches said real second final value (V2f).

2. A method according to claim 1, wherein, for said first turbine engine (M1) being provided with a gas generator, and said surveillance parameter being the speed of rotation (Ng) of said gas generator, during the step a), the real first final value (V1f) of said surveillance parameter is determined by modulating a given reduced final value with the help of the external temperature (T0) of the surroundings of said rotorcraft.

3. A method according to claim 1, wherein, for said surveillance parameter being the power developed by said turbine engine, during step a), the real first final value (V1f) of said surveillance parameter is determined by modulating a given reduced final value with the help of the external pressure (P0) and the temperature (T0) of the surroundings of said rotorcraft.

4. A method according to claim 1, wherein, for said rotorcraft being provided with a power transmission gearbox having two inlets connected respectively to the first and second turbine engines (M1 and M2), each inlet being suitable for accepting a maximum power, during a step a') that follows step a), the following steps are performed in succession:
    a'1) determining an intermediate power that said first turbine engine (M1) is to deliver so that said surveillance parameter reaches said real first final value (V1f); and
    a'2) if said intermediate power is less than the maximum power accepted by said power transmission gearbox, then said real first final value (V1f) remains unchanged; or else
    a'3) if said intermediate power is greater than said maximum power accepted by said power transmission gearbox, then said real first final value (V1f) is made equal to the value that the surveillance parameter needs to reach in order to cause said final first power of said first turbine engine (M1) to be equal to said maximum power.

5. A method according to claim 4, wherein, during step a'), account is taken of engine mounting losses.

6. A method according to claim 1, wherein, prior to step c), said first and second turbine engines (M1 and M2) together develop a total power, and said real second final value (V2f) is readjusted during step b) in such a manner that the total power developed before said health check is equal to the total power developed during said health check.

7. A device for implementing a health check on at least one turbine engine (M1) of a twin-engined rotorcraft, said rotorcraft being provided with first and second turbine engines (M1 and M2) respectively controlled by first and second control means (MC1 and MC2), the device comprising check means (C) provided with main means (C1) for successively:
    determining the real first final value (V1f) of a surveillance parameter of the first turbine engine (M1) that needs to be reached in order to perform the health check of said first turbine engine (M1) accurately;
    assuming that the real second final value (V2f) of the surveillance parameter of the second turbine engine (M2) is equal to the second normal value (V2c) of said second turbine engine (M2);
    determining the difference between the real first final value (V1f) and the second final value (V2f);
    if the difference is greater than a predetermined threshold, readjusting said second final value (V2f) so that said difference becomes less than said threshold; and
    controlling the first and second control means (MC1 and MC2) so that the surveillance parameters of the first and second turbine engines (M1 and M2) respectively reach the real first and second final values (V1f and V2f).

8. A device according to claim 7, including secondary means (C2) that receive a plurality of items of information for performing the health check and for establishing a diagnosis of the health of said first and second turbine engines (M1 and M2).

9. A device according to claim 8, wherein said secondary means (C2) is integrated in said check means (C).

10. A device according to claim 8, wherein each control means (MC1, MC2) includes secondary means (C2).

11. A device according to claim 8, wherein said information items come from main sensors (1) measuring the values of parameters of said first turbine engine (M1).

12. A device according to claim 8, wherein said secondary means (C2) integrates the effects of engine mounting that might modify a parameter of a turbine engine mounted on a rotorcraft as compared with the same turbine engine mounted on a test bench.

13. A device according to claim 7, wherein said main means (C1) integrate the effects of engine mounting that might modify a parameter of a turbine engine mounted on a rotorcraft compared with the same turbine engine mounted on a test bench.

14. A device according to claim 7, wherein the main means (C1) determines automatically the real first final value (V1f)

that a surveillance parameter of said first turbine engine needs to reach in order to ensure that the health check is performed accurately.

15. A device according to claim 7, wherein said device includes an interface to enable the pilot of said rotorcraft to specify to the main means (C) the real first final value (V1$f$) that a surveillance parameter of said first turbine engine (M1) is to reach so that the health check is performed accurately.

16. A device according to claim 7, wherein the real first final value (V1$f$) that a surveillance parameter of said first turbine engine (M1) is to reach in order to ensure that the health check is performed accurately is determined with the help of a reduced final value modulated by at least the external pressure surrounding said rotorcraft, an interface enabling the pilot of said rotorcraft to specify the reduced final value to the main means (C) so that said main means (C) determine said real first final value (V1$f$) to be reached by said surveillance parameter of said first turbine engine (M1).

* * * * *